United States Patent
Jarry et al.

(10) Patent No.: US 11,833,619 B2
(45) Date of Patent: Dec. 5, 2023

(54) ALUMINIUM ALLOY STRIP OR SHEET FOR NO-FLUX OR REDUCED-FLUX SOLDERING

(71) Applicant: CONSTELLIUM NEUF-BRISACH, Biesheim (FR)

(72) Inventors: Philippe Jarry, Grenoble (FR); Bechir Chehab, Voiron (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 0 days.

(21) Appl. No.: 17/787,185

(22) PCT Filed: Dec. 14, 2020

(86) PCT No.: PCT/FR2020/052414
§ 371 (c)(1),
(2) Date: Jun. 17, 2022

(87) PCT Pub. No.: WO2021/123585
PCT Pub. Date: Jun. 24, 2021

(65) Prior Publication Data
US 2023/0032540 A1    Feb. 2, 2023

(30) Foreign Application Priority Data
Dec. 20, 2019 (FR) ...................................... 1915094

(51) Int. Cl.
*B23K 35/28* (2006.01)
*B23K 35/02* (2006.01)
*C22C 21/04* (2006.01)

(52) U.S. Cl.
CPC ........ *B23K 35/0238* (2013.01); *B23K 35/288* (2013.01); *C22C 21/04* (2013.01)

(58) Field of Classification Search
None
See application file for complete search history.

(56) References Cited

U.S. PATENT DOCUMENTS

| 8,413,876 B2 | 4/2013 | Sandrine et al. |
| 2018/0345420 A1* | 12/2018 | Jacoby ................. B23K 35/286 |
| 2021/0170532 A1 | 6/2021 | Chehab et al. |

FOREIGN PATENT DOCUMENTS

| EP | 1687456 B1 | 6/2007 |
| EP | 3363582 A1 | 8/2018 |

(Continued)

OTHER PUBLICATIONS

International Search Report of International Application No. PCT/FR2020/052414, dated Mar. 15, 2021.

(Continued)

*Primary Examiner* — Daniel J. Schleis
(74) *Attorney, Agent, or Firm* — MCBEE MOORE & VANIK IP, LLC

(57) ABSTRACT

Brazing strip or sheet comprising:
a core layer made of aluminum alloy;
a brazing layer made of aluminum alloy, clad on at least one face of the core layer;
optionally an intermediate layer made of aluminum alloy, clad on at least one face either between the core layer and the brazing layer or the core layer without any other layer on top; characterized in that the brazing layer alloy comprises, in mass percentages:
from 7 to 13% Si, at most 0.8% Fe, at most 0.45% Cu, at most 0.20% Mn, at most 0.15% Mg, at most 0.20% Zn, at most 0.20% Ti, at most 0.04% Bi, from 0.01 to 0.10% Y, from 0.01 to 0.10% Sn, remainder aluminum and impurities.

17 Claims, 2 Drawing Sheets

(56) References Cited

FOREIGN PATENT DOCUMENTS

| | | |
|---|---|---|
| EP | 3363583 A1 | 8/2018 |
| EP | 3176273 B1 | 12/2018 |
| FR | 3074717 A1 | 6/2019 |
| WO | 200238326 A1 | 5/2002 |
| WO | 03043777 A1 | 5/2003 |
| WO | 2004054750 A1 | 7/2004 |
| WO | 2007042206 A1 | 4/2007 |
| WO | 2016/015974 A1 | 2/2016 |
| WO | 2016015917 A1 | 2/2016 |
| WO | 201645973 A1 | 3/2016 |
| WO | 2016134967 A1 | 9/2016 |
| WO | 2017137236 A1 | 8/2017 |
| WO | 2018184806 A1 | 10/2018 |

OTHER PUBLICATIONS

Sharma et al., "Influence of Various Additional Elements in Al Based Filler Alloys for Automotive and Brazing Industry," Journal of Welding and Joining, vol. 33, No. 5, 2015, 8 pages.

\* cited by examiner

[Fig. 1]
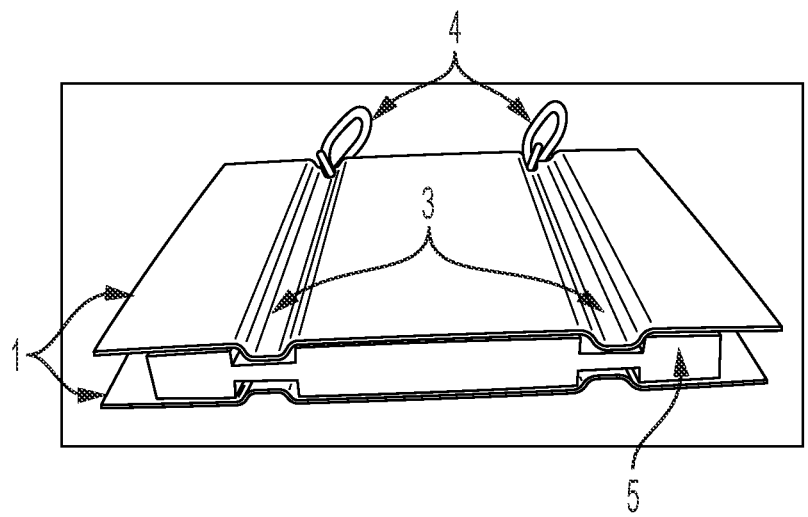
[Fig. 2]
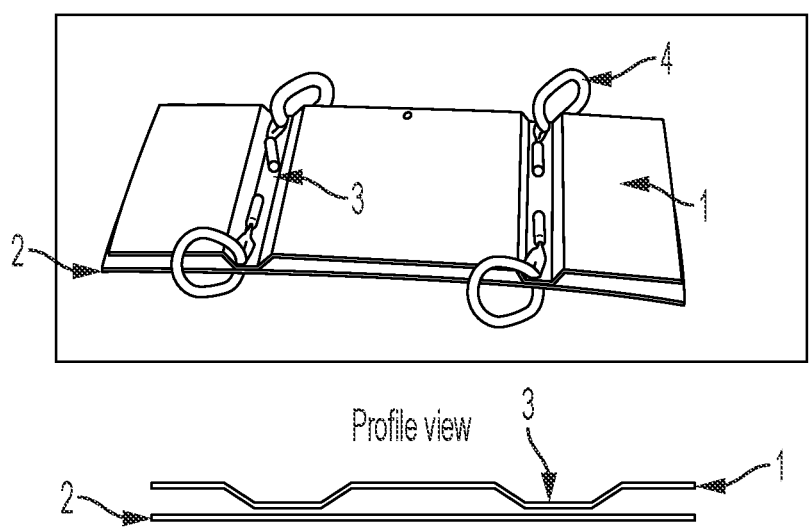

[Fig. 3]
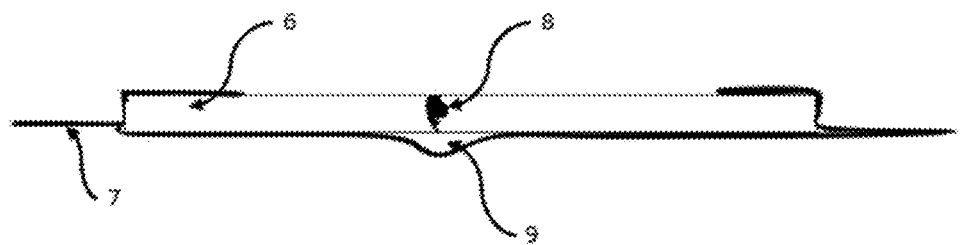
[Fig. 4]
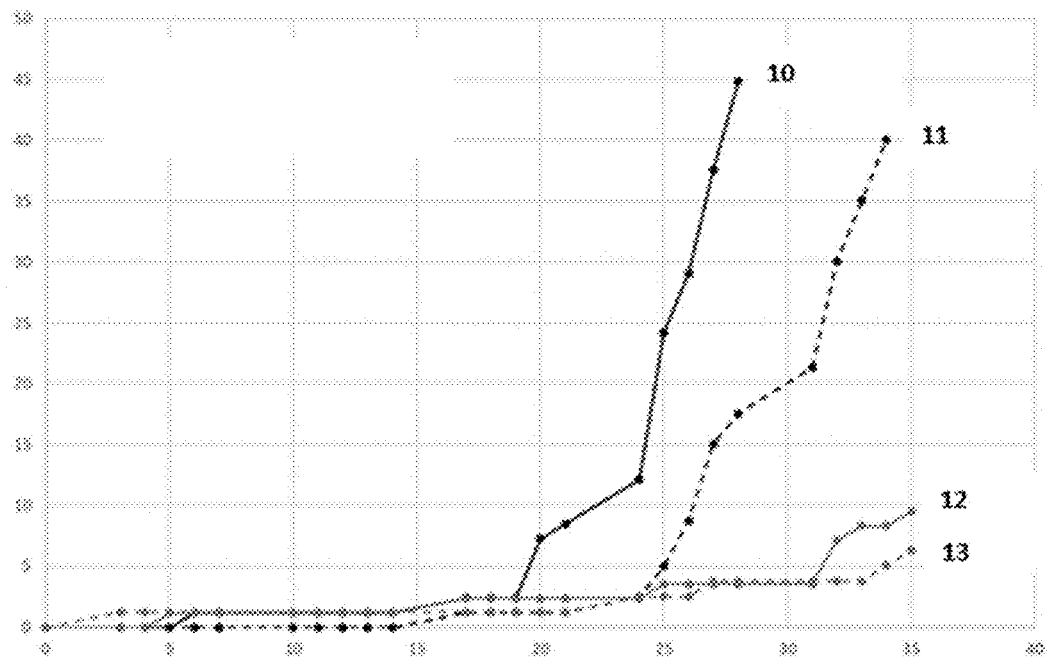

ALUMINIUM ALLOY STRIP OR SHEET FOR NO-FLUX OR REDUCED-FLUX SOLDERING

CROSS-REFERENCE TO RELATED APPLICATIONS

This application is the National Stage entry of International Application No. PCT/FR2020/052414, filed 14 Dec. 2020, which claims priority to French Patent Application No. 1915094, filed 20 Dec. 2019.

BACKGROUND

Field

Technical Field

The invention relates to aluminum alloy strips or sheets coated on one or two faces with a brazing layer, and optionally with one or two intermediate layers, and intended for manufacturing brazed components, particularly heat exchangers for the automobile or construction industry, and more specifically components assembled by fluxless or fluxfree brazing, preferably in a controlled atmosphere.

Description of Related Art

Currently, industrial brazing for heat exchangers is essentially carried out with the Nocolok® process in large continuous controlled atmosphere brazing (CAB) furnaces. However, automobile manufacturers seek to substantially reduce, or eliminate, the use of flux. This results in a growing demand for the provision of brazing strips or sheets capable of ensuring satisfactory brazing with a substantially reduced quantity of flux or even with no application of flux.

When large quantities of flux are used for brazing, flux residue is present inside the heat exchangers. It can interact with the cooling liquid, which can result in obstruction of the cooling channels and thus induce a loss of heat exchange efficiency. Furthermore, the environmental and health risks (sometimes CMR (carcinogenic, mutagenic and toxic for reproduction) substances containing fluorine) and the cost are additional drawbacks. Moreover, heat exchanger manufacturers are now subject to new specifications in terms of flux residue, which oblige them to reduce the quantities of flux used until now. For reference, standard fluxing is from 5 to 10 g/m$^2$ on average within +/−3 g/m$^2$. Reference is made to average fluxing as the flux distribution is not necessarily homogeneous on the entire surface. For example, there may be a localized application of flux (for example using a flux in paste form) and/or it is possible to flux on only one face or two faces of the object to be brazed.

It is furthermore noted that post-brazing component cleaning, to remove the flux, is costly, time-consuming, and is not applicable to all configurations.

Vacuum brazing is a technology known to be effective for fluxfree brazing, but it is costly and unsuitable for large components. It operates with batch furnaces having long cycle times.

Furthermore, few clients are equipped with this system. For this reason, a reliable, fluxfree CAB solution is needed to replace vacuum brazing.

Numerous patents have been filed on core and/or cladding compositions, with or without an intermediate layer, for successful fluxfree brazing.

The patent EP1687456B1 discloses an alloy containing a large quantity of Mg (0.3 to 3% by mass) and coated on at least one face with a 4xxx alloy comprising between 0.01 and 0.5% of at least one element chosen from Ag, Be, Bi, Ce, La, Pb, Pd, Sb, Y or Mischmetal. The addition of yttrium to the core alloy between 0.01 and 0.5% is also disclosed. The best result in terms of brazeability is obtained with an addition of 0.15% Bi in the core at the same time as an addition of 0.19% Bi in the 4047 cladding.

The U.S. Pat. No. 8,413,876B2 discloses an addition of yttrium between 0.01 and 0.5% in the core alloy. The invention as described in this patent is applicable regardless of the Mg composition of the core of less than 3% and associated with a cladding layer containing at least one surface tension modifying element among Ag, Be, Ce, La, Pb, Pd, Sb and Mischmetal. An addition of Sn in the core alloy of less than 3% is also an option.

However, the solutions as described in the two patents hereinabove could be enhanced, particularly to suit all conditions (thickness, temper, configuration of the different layers in relation to each other, brazing furnace type and quality, etc.).

In the absence of flux, the oxide layer present on the surface of the brazing plate must be broken from the inside. Elements having a free oxide formation energy less than or equal to that of $Al_2O_3$ are good candidates for carrying out oxide film fragmentation. The most common are Mg, Be, Li, Ca, Ce, Zr, Sr, Ba, La, Y. However, these elements also have a high reactivity with oxygen and can form an excessive quantity of oxide on the surface if they are added in a large quantity in the cladding alloy. According to patent applications EP3363583A1 and EP3363582A1, preference should be given to additions of Li, Be or Mg in the cladding alloy as they result in the formation of oxide particles on the surface with a volume variation ratio less than 1. In the case of addition in the core alloy, elements such as Mg, Li, Be, Ca, Ce, La, Y and Zr should have a content between 0.01 and 2%. In the case of addition in the cladding alloy, these elements should be between 0.001 and 0.03%. The elements Bi, Li, Ca and Mg also seem to be of interest, particularly for enhancing the wettability of the surface.

The patent EP3176273B1 discloses a core alloy composition with Mg between 0.35 and 0.8% and a 4xxx cladding alloy with additions of Bi between 0.001 and 0.05%, as well as strict limitation of the readily oxidizable elements contained in the cladding alloy. Yttrium is cited among these readily oxidizable elements of which the content must not exceed 0.01%. The other elements to be limited are Mg, Be, Ca, Li, Na, La and Ce. It is said that these elements are oxidized during the manufacturing and/or brazing process, which would degrade the brazing performances.

Other solutions also exist (described for example in the applications WO03043777, WO200238326, WO200238326 or WO2004054750), but they are expensive and complex to implement, as they mean the addition of one or more additional layers, with a very specific composition, most often placed outside the brazing layer in relation to the core.

The solution as proposed in the present application differs from the prior art at least in that it relates to simultaneous additions of yttrium and tin in the cladding alloy, without any addition of these elements in the core alloy, as well as by the absence of very specific additional layers outside the brazing layer in relation to the core. According to the envisaged application, the alloy can contain Mg (for fluxfree brazing) or not (for brazing with a low quantity of flux).

SUMMARY

The solution disclosed in the present invention has several advantages, in particular:

an additional pickling step is not required at the end of the manufacture of the strip or sheet according to the present invention;

the composition of the brazing layer according to the present invention makes it possible to perform fluxfree brazing, in particular in combination with a core layer having a quantity of Mg greater than 0.1% and up to 0.6% by mass. Preferably, the core layer has a maximum quantity of Mg of up to 0.35%, or up to 0.25% by mass.

This alternative embodiment with a core having Mg<0.35% is tolerant to flux residue potentially present in brazing furnaces. Indeed, the furnaces which are usually used for performing flux brazing can have flux residue. This alternative embodiment then has the advantage of being able to use, to perform fluxfree brazing, a furnace which is usually used for flux brazing. This offers the advantage of avoiding having to use either a fully cleaned furnace before performing fluxfree brazing, or a furnace intended for fluxfree brazing.

The invention relates to a brazing strip or sheet comprising, preferably consisting of:

a core layer made of aluminum alloy, preferably 3xxx type;
a brazing layer made of aluminum alloy, preferably 4xxx type, clad on at least one face of the core layer;
optionally an intermediate layer made of aluminum alloy, preferably 3xxx type, clad on at least one face between the core layer and the brazing layer;
optionally a corrosion-proof layer on the optional face of the core layer with no brazing layer; characterized in that the brazing alloy comprises, in mass percentages:
from 7 to 13% Si, at most 0.8% Fe, at most 0.45% Cu, at most 0.20% Mn, at most 0.15% Mg, at most 0.20% Zn, at most 0.20% Ti, at most 0.04% Bi, from 0.01 to 0.10% Y, from 0.01 to 0.10% Sn, remainder aluminum and impurities.

The invention also relates to the use of brazing strip or sheet according to the present invention, in a fluxless or fluxfree brazing process for manufacturing heat exchangers.

BRIEF DESCRIPTION OF THE DRAWINGS

FIG. 1 is a photo showing the sample used for the low-flux brazing tests of the examples.

FIG. 2 is a photo showing the sample used for the fluxfree brazing tests of the examples.

FIG. 3 is a diagram of the assembly for the corrosion resistance tests of the examples.

FIG. 4 is a graph showing the results of the corrosion resistance tests of the examples.

DETAILED DESCRIPTION OF A PREFERRED EMBODIMENT

Unless specified otherwise, all the indications concerning the chemical composition of the alloys are expressed as a mass percentage based on the total mass of the alloy.

The alloys are designated in accordance with the Aluminum Association rules, known to a person skilled in the art.

Temper definitions are stated in the European standard EN 515.

The solution as described in the present application is a brazing strip or sheet, for example for brazing heat exchangers, which can be brazed in a conventional controlled atmosphere brazing (CAB) furnace, in the absence of flux or with a low quantity of flux, and even in the presence of flux under certain conditions.

In the present application, the terms "low flux" and "low quantity of flux" mean the use of a quantity of flux less than 5 g/m$^2$ on average, preferably less than 2.5 g/m$^2$ on average, more preferably less than 1 g/m$^2$ on average. The grams expressed correspond to the dry matter of flux after stoving, for example at 300° C. for 1-2 minutes or at 90° C. for 10-15 minutes. It should be noted that the concept of low flux can also cover processes wherein the flux is only applied on some parts of the object to be brazed and/or on a single face. The flux generally comprises fluorine, potassium and optionally a binder, generally organic and generally up to 34% binder with respect to the total flux mass. For example, the flux sold under the brand NOCOLOK® is a potassium fluoride salt having a general formula $K_xAlF_y$, wherein x is from 1 to 3 and y from 4 to 6.

In the present application, the terms "controlled atmosphere" mean an atmosphere having a majority gas, for example nitrogen or argon, and having a limited quantity of $O_2$, preferably comprising less than 150 ppm, more preferably less than 100 ppm, even more preferably less than 50 ppm, and even more preferably less than 20 ppm of oxygen.

Core Layer

The alloy of the core layer of the brazing strip or sheet according to the present invention is preferably AA3xxx type.

Preferably, the core layer alloy comprises, in mass percentages:

Si: at most 0.8%, preferably at most 0.6%, more preferably at most 0.5%, and even more preferably at most 0.25%;
Fe: at most 0.5%, preferably at most 0.4%, more preferably at most 0.3%;
Cu: at most 1.2%, preferably from 0.20 to 1.2%, more preferably from 0.25 to 1.1%, more preferably from 0.3 to 1.0%, more preferably from 0.5 to 1.0%, and even more preferably from 0.5 to 0.8%;
Mn: from 0.8 to 2.2%, preferably from 0.9 to 2.1%, more preferably from 1.0 to 2.0%, more preferably from 1.2 to 1.8%, even more preferably from 1.2 to 1.65%;
Mg: at most 0.6%, preferably at most 0.35%, more preferably at most 0.25%;
Zn: at most 0.30%, preferably at most 0.25%, more preferably at most 0.20%, and even more preferably less than 0.05%;
Ti: at most 0.30%, preferably at most 0.25%, more preferably at most 0.20%, even more preferably at most 0.14%, and even more preferably at most 0.12%; Remainder aluminum and impurities.

The impurities are preferably present at a rate of less than 0.05% each and less than 0.15% in total.

Preferably, the lower limit of Ti is greater than or equal to 0.05%.

Preferably, the mass proportion of Zr in the core layer alloy is less than 0.04%, preferably less than 0.02%.

According to an alternative embodiment, the core layer alloy comprises Mg, preferably from 0.05 to 0.35% by mass.

According to an alternative embodiment, the mass proportion of Mn in the core layer alloy is strictly greater than 1.2%.

According to a first alternative embodiment of the invention, the core layer alloy comprises, in mass percentages:

Si: at most 0.5%, preferably at most 0.4%, more preferably at most 0.3%, and even more preferably at most 0.2%;
Fe: at most 0.5%, preferably at most 0.4%, more preferably at most 0.3%, even more preferably at most 0.25%;

Cu: from 0.40 to 1.2%, preferably from 0.45 to 1.1%, more preferably from 0.5 to 1.0%;

Mn: from 0.8 to 1.7%, preferably from 0.9 to 1.6%, more preferably from 1.0 to 1.5%;

Mg: at most 0.04%, preferably at most 0.03%, more preferably at most 0.02%;

Zn: at most 0.30%, preferably at most 0.25%, more preferably at most 0.20%, and even more preferably less than 0.05%;

Ti: at most 0.30%, preferably at most 0.25%, more preferably at most 0.20%, even more preferably at most 0.14%, and even more preferably at most 0.12%;

Remainder aluminum and impurities.

The impurities are preferably present at a rate of less than 0.05% each and less than 0.15% in total.

Preferably, the lower limit of Ti is greater than or equal to 0.05%.

Preferably, the core layer according to the first alternative embodiment is used for brazing with a low quantity of flux, and not fluxfree brazing.

According to a second alternative embodiment of the invention, the core layer alloy comprises, in mass percentages:

Si: at most 0.5%, preferably at most 0.4%, more preferably at most 0.3%, and even more preferably at most 0.2%;

Fe: at most 0.5%, preferably at most 0.4%, more preferably at most 0.3%, even more preferably at most 0.25%;

Cu: from 0.50 to 1.2%, preferably from 0.55 to 1.1%, more preferably from 0.6 to 1.0%;

Mn: from 0.8 to 1.7%, preferably from 0.9 to 1.6%, more preferably from 1.0 to 1.5%;

Mg: from 0.05 to 0.35%, preferably from 0.075 to 0.30%, more preferably from 0.1 to 0.25%;

Zn: at most 0.30%, preferably at most 0.25%, more preferably at most 0.20%, and even more preferably less than 0.05%;

Ti: at most 0.30%, preferably at most 0.25%, more preferably at most 0.20%, even more preferably at most 0.14%, and even more preferably at most 0.12%;

Remainder aluminum and impurities.

The impurities are preferably present at a rate of less than 0.05% each and less than 0.15% in total.

Preferably, the lower limit of Ti is greater than or equal to 0.05%.

According to a third alternative embodiment of the invention, the core layer alloy comprises, in mass percentages:

Si: at most 0.8%, preferably at most 0.7%, more preferably at most 0.6%;

Fe: at most 0.5%, preferably at most 0.4%, more preferably at most 0.3%;

Cu: from 0.20 to 0.95%, preferably from 0.25 to 0.8%, more preferably from 0.3 to 0.7%;

Mn: from 1.3 to 2.2%, preferably from 1.4 to 2.1%, more preferably from 1.5 to 2.0%;

Mg: from 0.2 to 0.8%, preferably from 0.3 to 0.7%, more preferably from 0.4 to 0.6%;

Zn: at most 0.30%, preferably at most 0.25%, more preferably at most 0.20%, and even more preferably less than 0.05%;

Ti: at most 0.30%, preferably at most 0.25%, more preferably at most 0.20%, even more preferably at most 0.14%, and even more preferably at most 0.12%;

Remainder aluminum and impurities.

The impurities are preferably present at a rate of less than 0.05% each and less than 0.15% in total.

Preferably, the lower limit of Ti is greater than or equal to 0.05%.

Intermediate Layer

The brazing strip or sheet according to the present invention can comprise at least one intermediate layer. The alloy of this intermediate layer is generally a so-called sacrificial alloy, which is intended to enhance the corrosion resistance of the core alloy.

The alloy of the intermediate layer can for example be 3xxx, 1xxx, or 7xxx type. Mention can be made of the AA3003, AA3207 or AA1050 alloys.

Preferably, the intermediate layer does not comprise Zn, or as an impurity in quantities less than 0.05%.

However, according to an alternative embodiment, the intermediate layer can comprise Zn, preferably less than 2% Zn, more preferably less than 1% by mass.

Preferably, the quantity of Mg in the intermediate layer is less than 0.10%, preferably less than 0.075%, more preferably less than 0.05% by mass.

By way of illustration, the alloys cited hereinabove have the following composition, in mass percentages:

AA3003: less than 0.6% Si; less than 0.7% Fe; from 0.05 to 0.20% Cu; from 1.0 to 1.5% Mn; less than 0.10% Zn, impurities less than 0.05% each and less than 0.15% in total; remainder Al.

AA3207: less than 0.30% Si; less than 0.45% Fe; less than 0.10% Cu; from 0.40 to 0.8% Mn; less than 0.10% Mg; less than 0.10% Zn, impurities less than 0.05% each and less than 0.15% in total; remainder Al.

AA1050: less than 0.25% Si; less than 0.40% Fe; less than 0.05% Cu; less than 0.05% Mn; less than 0.05% Mg; less than 0.05% Zn, less than 0.03% Ti; less than 0.05% V; impurities less than 0.03% each; at least 99.50% Al.

Brazing Layer

The strip or sheet according to the present invention comprises at least one brazing layer. The alloy of the brazing layer of the brazing strip or sheet according to the present invention is preferably 4xxx type. Mention can be made for example, and preferably, of AA4045 or AA4343 type alloys, with voluntary additions of Y and Sn and a limitation of the quantity of Bi.

Preferably, the alloy of the brazing layer of the brazing strip or sheet according to the present invention comprises at most 0.03%, preferably at most 0.02% Bi.

Preferably the alloy of the brazing layer of the brazing strip or sheet according to the present invention comprises Sn: from 0.015 to 0.08%, preferably from 0.02 to 0.065%.

Preferably, the alloy of the brazing layer of the brazing strip or sheet according to the present invention comprises Y: from 0.015 to 0.08%, preferably from 0.02 to 0.065%.

Preferably, the brazing layer alloy comprises, in mass percentages:

Si: from 7 to 13%, preferably from 8 to 12%, more preferably from 9 to 11%;

Fe: at most 0.8%, preferably at most 0.7%, more preferably at most 0.6%;

Cu: at most 0.45%, preferably at most 0.35%, more preferably at most 0.25%;

Mn: at most 0.20%, preferably at most 0.15%, more preferably at most 0.10%;

Mg: at most 0.15%, preferably at most 0.10%, more preferably at most 0.05%, even more preferably at most 0.025%;

Zn: at most 0.20%, preferably at most 0.15%, more preferably at most 0.10%;

Ti: at most 0.20%, preferably at most 0.15%, more preferably at most 0.10%;

Bi: at most 0.04%, preferably at most 0.03%, more preferably at most 0.02%;

Y: 0.01 to 0.10%, preferably 0.015 to 0.08%, more preferably 0.02 to 0.065%;

Sn: 0.01 to 0.10%, preferably 0.015 to 0.08%, more preferably 0.02 to 0.065%;

Remainder aluminum and impurities.

The impurities are preferably present at a rate of less than 0.05% each and less than 0.15% in total.

Strip or Sheet

The strip or sheet according to the present invention can have a configuration with several layers, and in particular with 2, 3, 4 or 5 layers.

The configuration with two layers comprises a core clad with a brazing layer on a single face.

The configuration with three layers comprises:
- either a core layer clad on both faces thereof with a brazing layer;
- or a core layer clad on a single face with an intermediate layer and a brazing layer;
- or a core layer clad on a first face with a brazing layer and on the other face with a protective layer to enhance the corrosion resistance, for example a 1xxx or 7xxx type alloy.

The configuration with four layers comprises:
- either a core layer clad on a first face with an intermediate layer and a brazing layer and on the other face with a brazing layer;
- or a core layer clad on a first face with an intermediate layer and a brazing layer and on the other face with a protective layer to enhance the corrosion resistance, for example a 1xxx or 7xxx type alloy.

The configuration with five layers comprises a core layer clad on one of the two faces thereof with an intermediate layer and a brazing layer.

Preferably, the strip or sheet according to the present invention does not comprise other layers than those described hereinabove, i.e., a core layer, one or two brazing layers, optionally one or two intermediate layers and optionally a protective layer.

Preferably, the brazing layer is the outermost layer of the strip or sheet according to the invention, i.e., no other layer covers it, and it preferably has one face not covered by another layer.

According to a first alternative embodiment, the strip or sheet according to the invention comprises no intermediate layer. This alternative embodiment is in particular adapted for applications in the field of radiators, water condensers or battery coolers for electric vehicles.

According to a second alternative embodiment, the strip or sheet according to the invention comprises at least one intermediate layer. This alternative embodiment is in particular adapted for applications in the field of charge air coolers (CACs) or evaporators. CACs are generally located in the exhaust gas recirculation (EGR) of diesel engines, which must particularly resist acid corrosion. These exchangers are also known as "Water Charge Air Coolers" or "water CACs".

Preferably, the protective layer for enhancing corrosion resistance does not comprise Zn, or as an impurity according to a mass proportion less than 0.05%.

Preferably, the protective layer for enhancing corrosion resistance is an AA7xxx type alloy, having preferably a mass proportion of Mn less than 0.1%, for example an AA7072 type alloy.

According to an alternative embodiment, the strip or sheet according to the present invention comprises no protective layer for enhancing corrosion resistance.

The layers as described hereinabove can be optionally homogenized.

They are generally assembled by co-rolling, by hot rolling and/or cold rolling, according to a technique known to a person skilled in the art. Before hot rolling, the strip or sheet is heated, according to a technique known to a person skilled in the art. It is optionally subjected to an intermediate annealing before or during the cold rolling, but preferably there is no intermediate annealing.

The final annealing of the sheet or strip according to the present invention makes it possible to obtain an H24 or O temper.

The strip or sheet according to the present invention can optionally be pickled, with an acid or alkaline solution, according to a technique known to a person skilled in the art. The present invention makes it possible however to avoid pickling without reducing the quality of the fluxless or fluxfree brazing. Preferably, the strip or sheet according to the present invention is not pickled.

Brazing

The brazing can be performed without flux or with a low quantity of flux, for example in a controlled atmosphere, for example nitrogen or argon, at a temperature from 580 to 620° C., which enables the melting of the brazing alloy, but also ensures the solution heat treatment of the core alloy.

For core alloys having a significant quantity of Mg (for example greater than 0.2% by mass), a rapid cooling, for example with pulsed air, can be recommended, generally followed by aging of the assembled component at a temperature from 80 to 250° C.

It should be noted that the strip or sheet according to the present invention can be brazed in a wide range of furnaces, intended for fluxfree brazing or not. Preferably, the furnace used is intended for fluxfree brazing.

It should also be noted that the present invention could be used in a controlled atmosphere brazing furnace (for example comprising less than 20 ppm oxygen) or in a furnace having a so-called degraded atmosphere (for example comprising up to 50, 100 or 150 ppm of oxygen).

Preferably, the brazing furnace operates in a controlled atmosphere comprising less than 20 ppm oxygen. Preferably, the brazing furnace operates with a dew point less than −20° C., more preferably less than −30° C., even more preferably less than −35° C., and even more preferably than −40° C.

EXAMPLES

1. Low-Flux Brazing (5 g/m$^2$)

Four industrial coils were produced having the following configuration: 4xxx brazing layer (7.5% of the total thickness)/AA3003 intermediate layer (10% of the total thickness)/3xxx-1 core layer/4xxx brazing layer (7.5% of the total thickness). The AA3003 and 4xxx layers were not homogenized. The core layer was homogenized at a temperature of 580 to 620° C. for 1 to 24 hours. The sheets were rolled to a total thickness of 2.3 mm, then cold-rolled to a total thickness of 480 μm, with no intermediate annealing. The final annealing was carried out at a temperature less than 400° C. for an O temper. The composition of the different layers used is given in Table 1 hereinafter, in mass percentages.

TABLE 1

|    | 4045-1 | 4xxx-Ref1 | 4xxx-Ref2 | 4xxx-1 | 3xxx-1 | AA3003 |
|----|--------|-----------|-----------|--------|--------|--------|
| Si | 9.8    | 10.0      | 9.8       | 9.7    | 0.2    | 0.22   |
| Fe | 0.25   | 0.11      | 0.09      | 0.09   | 0.14   | 0.6    |
| Cu | 0.01   | 0.19      | 0.19      | 0.19   | 0.65   | 0.08   |
| Mn | 0.02   | 0.002     | 0.002     | 0.002  | 1.37   | 1.21   |
| Mg | 0.001  | 0.001     | 0.001     | 0.001  | —      | 0.007  |
| Cr | —      | 0.001     | 0.001     | 0.001  | —      | —      |
| Ni | 0.01   | 0.005     | 0.005     | 0.004  | —      | —      |
| Zn | —      | 0.002     | 0.002     | 0.002  | —      | —      |
| Ti | 0.04   | 0.03      | 0.03      | 0.03   | 0.08   | 0.08   |
| Sr | 0.012  | 0.012     | 0.045     | —      | —      | —      |
| Bi | —      | 0.13      | —         | —      | —      | —      |
| La | —      | —         | 0.058     | —      | —      | —      |
| Y  | —      | —         | —         | 0.06   | —      | —      |
| Sn | —      | —         | —         | 0.05   | —      | —      |

A pickling step with a sulfo-fluoric solution ($H_2SO_4$ 8 g/l; HF 0.4 g/l, 50° C.) was carried out for one of the configurations comprising the brazing layer based on 4045-1 before brazing. The pickling was carried out on a line advancing at a speed of 10 m/min. The surface of the sample was cleaned and then pickled by prilling with the sulfo-fluoric solution described hereinabove. The sample was then rinsed with deionized water.

The different configurations were then tested in terms of brazing quality under low-flux brazing conditions. The samples were fluxed on a single face with approximately 1.3-1.8 g/m² of Nocolok® flux. The average quantity of flux for a full sample was therefore approximately 0.65-0.8 g/m² of flux.

The brazing test was carried out according to the following protocol, which makes it possible to simulate brazing stamped components. For this purpose, 50 mm×60 mm foils were stamped in the absence of lubricant to add two longitudinal lines as illustrated in FIG. 1. After stamping, the foils were degreased with an acetone solution, then air-dried. Two stamped foils having the same composition were then fastened together using stainless steel pins, with a chock positioned at one end of the assembly, as illustrated in FIG. 1. The chock was made of steel and measured 60 mm long, 5 mm wide and 0.25 mm in thickness. In FIG. 1, reference 1 corresponds to the stamped foils, reference 3 to two stamped lines, reference 4 to pins and reference 5 to the stainless steel chock. The foils thus assembled were brazed with a low quantity of flux and with a quantity of oxygen kept below 5 ppm. The brazing cycle was as follows:
first temperature rise to approximately 575-580° C. with a rate of approximately 24-28° C./min;
second temperature rise to approximately 600° C. with a rate of approximately 2.5° C./min;
holding for 3 minutes at 600° C.+/−2° C.;
cooling to approximately 400° C. with a rate of approximately 24-28° C./min.

The length of each brazing joint was then measured. For each configuration, three samples were produced. For each sample, two measurements were made at the two stamped longitudinal lines.

The results of the brazing test are shown in Table 2 hereinafter.

TABLE 2

|        | 4xxx       | Pickling | Brazed length (mm) | % brazed length |
|--------|------------|----------|--------------------|-----------------|
| Ref-1  | 4045-1     | no       | 21.1               | 46.9            |
| Ref-2  | 4045-1     | yes      | 26.3               | 58.4            |
| Ref-3  | 4xxx-Ref1  | no       | 23.5               | 52.2            |
| Ref-4  | 4xxx-Ref2  | no       | 20.6               | 45.8            |
| Comp-1 | 4xxx-1     | no       | 31.8               | 70.6            |

According to Table 2 hereinabove, the brazing layer according to the present invention (Comp-1) makes it possible to ensure a good brazing quality with a low quantity of flux. It should be noted that this is not the case for the other compositions tested, except for Ref-2 which is slightly superior to the other references, while remaining inferior to the composition according to the present invention, and which required a pickling step before brazing.

The brazing strip or sheet according to the present invention therefore makes it possible to avoid a pickling step before carrying out low-flux brazing.

2. Fluxfree Brazing

Different configurations were tested on a laboratory scale, by varying the type of brazing layer, the type of core and the temper. Each configuration comprised a core layer clad on two faces with a brazing layer each representing 7.5% of the total thickness. The total thickness was 400 μm.

The samples were manufactured as follows:
homogenizing before rolling (temperature rise with a rate of 50° C./h; holding for 8h at 600° C.; cooling with a rate of 15° C./h to 480° C.; then removal from furnace and cooling in ambient air);
hot rolling from 55 to 3.6 mm in thickness;
cold rolling from 3.6 to 0.4 mm in thickness;
for 0 temper samples: O temper recrystallization (temperature rise with a rate of 50° C./h to 360° C.; holding for 2 h at 360° C.; air cooling);
for H24 temper samples: H24 temper recrystallization (temperature rise with a rate of 50° C./h to 320° C.; holding for 1h at 320° C.; air cooling).

The compositions of the different layers used are given in Table 3 hereinafter, as mass percentages.

TABLE 3

|    | xxx-Ref | 4045-2 | 4xxx-2  | 3xxx-2 | 3xxx-3 |
|----|---------|--------|---------|--------|--------|
| Si | 9.7     | 9.8    | 9.5     | 0.2    | 0.49   |
| Fe | 0.23    | 0.20   | 0.19    | 0.15   | 0.15   |
| Cu | 0.21    | 0.006  | —       | 0.77   | 0.50   |
| Mn | 0.01    | 0.02   | 0.01    | 1.36   | 1.64   |
| Mg | —       | <0.014 | <0.014  | 0.16   | 0.51   |
| Zn | —       | —      | —       | —      | —      |
| Ti | 0.02    | 0.02   | 0.02    | 0.08   | 0.08   |
| Bi | 0.14    | —      | —       | —      | —      |
| Sr | 0.010   | 0.018  | —       | —      | —      |
| Li | —       | —      | —       | —      | —      |
| Y  | —       | —      | 0.05    | —      | —      |
| Sn | —       | —      | 0.061   | —      | —      |

Each configuration was then tested in terms of its fluxfree brazing quality, according to the following protocol, which makes it possible to simulate brazing stamped components. For this purpose, 50 mm×60 mm foils were stamped in the absence of lubricant to add two longitudinal lines as illustrated in FIG. 2. After stamping, the foils were degreased with an acetone solution, then air-dried. Each stamped foil was then fastened to a flat foil having the same composition as the stamped foil, which was previously flattened using a press. The two foils were fastened together using stainless steel pins, as shown in FIG. 2. In FIG. 2, reference 1 corresponds to a stamped foil, reference 2 to a flat foil, reference 3 to two stamped lines and reference 4 to pins. The foils thus assembled were brazed without adding flux and with a quantity of oxygen kept below 5 ppm. The brazing cycle was as follows:

first temperature rise to approximately 575-580° C. with a rate of approximately 24-28° C./min;
second temperature rise to approximately 600° C. with a rate of approximately 2.5° C./min;
holding for 3 minutes at 600° C.+/−2° C.;
cooling to approximately 400° C. with a rate of approximately 24-28° C./min.

The length of each brazing joint was then measured. For each configuration, three samples were produced. For each sample, two measurements were made at the two stamped longitudinal lines.

The configurations tested and the results of the brazing test are shown in Table 4 hereinafter.

TABLE 4

|  | 4xxx | Core | Temper | Brazed length (mm) | % brazed length |
|---|---|---|---|---|---|
| Ref-5 | 4xxx-Ref3 | 3xxx-2 | O | 0.7 | 1.6 |
| Ref-6 | 4xxx-Ref3 | 3xxx-3 | O | 9.6 | 21.3 |
| Ref-7 | 4045-2 | 3xxx-2 | O | 0.4 | 0.9 |
| Comp-2 | 4xxx-2 | 3xxx-2 | O | 41.8 | 92.9 |
| Comp-3 | 4xxx-2 | 3xxx-2 | H24 | 42.3 | 94.0 |
| Comp-4 | 4xxx-2 | 3xxx-3 | O | 43.6 | 96.9 |

The results shown in Table 4 hereinabove demonstrate that the sheet or strip according to the present invention makes it possible to carry out quality fluxfree brazing, which is markedly superior to that with the reference compositions, with several types of core alloy and several tempers (O or H24 in the example).

The sample Ref-5 was pickled and then subjected to the same brazing test. This configuration (not illustrated here) also made it possible to obtain a good brazing quality. Also, the reference samples seem to need a pickling step to obtain satisfactory results in terms of brazing. The brazing strip or sheet according to the present invention therefore makes it possible to avoid a pickling step before carrying out fluxfree brazing.

3. Corrosion Behavior

Four configurations were compared in terms of the corrosion behavior thereof: Ref-7, Ref-7', Comp-2 and Comp-3. The configurations Ref-7, Comp-2 and Comp-3 correspond to those described in Table 4 hereinabove. The configuration Ref-7' corresponds to the configuration Ref-7 but in the H24 temper and not the O temper.

The corrosion behavior was determined using the following protocol:

prepare for each configuration a sample of dimensions 126 mm (L direction)×90 mm (TL direction), previously degreased with a white paper towel soaked in acetone;
protect the untested face and the four edges over a width of approximately 0.5 cm with a transparent vinyl adhesive (for example 3M vinyl 764 type);
clean the face to be tested with a paper towel soaked in acetone:
place the samples thus prepared on a rack with a gradient of approximately 60° with respect to the horizontal;
for each sample, perform a SWAAT test (Sea Water Acidified Acetic Test) as per the ASTM G85 A3 standard, particularly comprising an alternation of 30 min spray phases and 1h30 wet phases at a temperature of 49° C.

The number of perforations was recorded each day for each sample for the entire duration of the test, or 35 days. The perforations were visible at the back of each sample as they formed blisters in the adhesive applied on the untested face, as illustrated in FIG. 3. In FIG. 3, reference 6 corresponds to the sample; reference 7 corresponds to the adhesive; reference 8 corresponds to a perforation; reference 9 corresponds to a blister formed by a perforation.

The monitoring results of the number of perforations are shown in FIG. 4 in the form of a graph of the number of perforations per $dm^2$ as a function of the number of test days. Reference 10 corresponds to the sample Ref-7'; reference 11 corresponds to the sample Ref-7; reference 12 corresponds to the sample Comp-3; reference 13 corresponds to the sample Comp-2.

According to FIG. 4, it can be seen that the number of perforations is largely greater for the reference samples Ref-7' and Ref-7 than for the samples according to the present invention Comp-3 and Comp-2 (less than 10 perforations per $dm^2$ for the samples according to the present invention versus more than 40 perforations per $dm^2$ for the reference samples).

It should be noted that for the reference samples, it was necessary to stop counting the perforations before the end of the 35 days of the test, as counting had become impossible due to the clustering of blisters caused by perforations which were too close to one another.

Moreover, tests were also carried out to compare the solution with and without pickling.

Equivalent results were obtained. Therefore, the present invention has the advantage of being able to avoid an additional pickling step.

The invention claimed is:

1. A brazing strip or a sheet comprising:
   a core layer made of aluminum alloy, optionally 3xxx type;
   a brazing layer made of aluminum alloy, optionally 4xxx type, clad on at least one face of the core layer;
   optionally an intermediate layer made of aluminum alloy, optionally 3xxx type, clad on at least one face between the core layer and the brazing layer;
   optionally a corrosion-proof layer on the optional face of the core layer with no brazing layer;
   wherein the brazing alloy comprises, in mass percentages:
   from 7 to 13% Si, at most 0.8% Fe, at most 0.45% Cu, at most 0.20% Mn, at most 0.15% Mg, at most 0.20% Zn, at most 0.20% Ti, at most 0.04% Bi, from 0.01 to 0.10% Y, from 0.01 to 0.10% Sn, remainder aluminum and impurities.

2. The brazing strip or the sheet according to claim 1, wherein the brazing layer alloy comprises at most 0.03% Bi.

3. The brazing strip or the sheet according to claim 1, wherein the brazing layer alloy comprises:
   Sn: from 0.015 to 0.08%.

4. The brazing strip or the sheet according to claim 1, wherein the brazing layer alloy comprises:
   Y: from 0.015 to 0.08%.

5. The brazing strip or the sheet according to claim 1, wherein the brazing layer alloy comprises, in mass percentages:
   Si: from 8 to 12%;
   Fe: at most 0.7%;
   Cu: at most 0.35%;
   Mn: at most 0.15%;

Mg: at most 0.10%;
Zn: at most 0.15%;
Ti: at most 0.15%;
Bi: at most 0.03%;
Y: from 0.015 to 0.08%;
Sn: from 0.015 to 0.08%;
remainder aluminum and impurities.

6. The brazing strip or the sheet according to claim 1, wherein the core layer alloy comprises, in mass percentages:
Si: at most 0.8%;
Fe: at most 0.5%;
Cu: at most 1.2%;
Mn: from 0.8 to 2.2%;
Mg: at most 0.6%;
Zn: at most 0.30%;
Ti: at most 0.30%;
remainder aluminum and impurities.

7. The brazing strip or the sheet according to claim 1, comprising an intermediate layer of 3xxx, 1xxx or 7xxx type.

8. The brazing strip or the sheet according to claim 1, wherein said strip or sheet does not comprise other layers than the core layer, said one or two brazing layers, said optional one or two intermediate layers and said optional corrosion-proof layer.

9. A product comprising a brazing strip or sheet according to claim 1, wherein said product is adapted for a fluxless or fluxfree brazing process for manufacturing heat exchangers.

10. The brazing strip or the sheet according to claim 1, consisting of:
the core layer made of aluminum alloy, optionally 3xxx type;
the brazing layer made of aluminum alloy, optionally 4xxx type, clad on at least one face of the core layer;
optionally the intermediate layer made of aluminum alloy, optionally 3xxx type, clad on at least one face between the core layer and the brazing layer;
optionally the corrosion-proof layer on the optional face of the core layer with no brazing layer;
wherein the brazing alloy comprises, in mass percentages: from 7 to 13% Si, at most 0.8% Fe, at most 0.45% Cu, at most 0.20% Mn, at most 0.15% Mg, at most 0.20% Zn, at most 0.20% Ti, at most 0.04% Bi, from 0.01 to 0.10% Y, from 0.01 to 0.10% Sn, remainder aluminum and impurities.

11. The brazing strip or the sheet according to claim 2, wherein the brazing layer alloy comprises at most 0.02% Bi.

12. The brazing strip or the sheet according to claim 3, wherein the brazing layer alloy comprises:
Sn: from 0.02 to 0.065%.

13. The brazing strip or the sheet according to claim 4, wherein the brazing layer alloy comprises:
Y: from 0.02 to 0.065%.

14. The brazing strip or the sheet according to claim 5, wherein the brazing layer alloy comprises, in mass percentages:
Si: from 9 to 11%;
Fe: at most 0.6%;
Cu: at most 0.25%;
Mn: at most 0.10%;
Mg: at most 0.05%;
Zn: at most 0.10%;
Ti: at most 0.10%;
Bi: at most 0.02%;
Y: from 0.02 to 0.065%;
Sn: from 0.02 to 0.065%;
remainder aluminum and impurities.

15. The brazing strip or the sheet according to claim 6, wherein the core layer alloy comprises, in mass percentages:
Si: at most 0.6%;
Fe: at most 0.4%;
Cu: from 0.20 to 1.2%;
Mn: from 0.9 to 2.1%;
Mg: at most 0.6%;
Zn: at most 0.25%;
Ti: at most 0.25%;
remainder aluminum and impurities.

16. The brazing strip or the sheet according to claim 15, wherein the core layer alloy comprises, in mass percentages:
Si: at most 0.5%;
Fe: at most 0.3%;
Cu: from 0.25 to 1.1%;
Mn: from 1.0 to 2.0%;
Mg: at most 0.6%;
Zn: at most 0.20%;
Ti: at most 0.20%;
remainder aluminum and impurities.

17. The brazing strip or the sheet according to claim 7, wherein the intermediate layer is of AA3003, AA3207 or AA1050 type.

* * * * *